United States Patent [19]
Parsons

[11] 3,790,152
[45] Feb. 5, 1974

[54] MELTABLE MATRIX CHUCKING APPARATUS

[76] Inventor: John T. Parsons, 205 Wellington, Traverse City, Mich. 49684

[22] Filed: Apr. 1, 1971

[21] Appl. No.: 130,218

[52] U.S. Cl.......................... 269/7, 29/559, 269/58
[51] Int. Cl............................................... B23q 3/00
[58] Field of Search........ 269/7, 22, 55, 58; 29/559; 51/277

[56] References Cited
UNITED STATES PATENTS

| | | | |
|---|---|---|---|
| 2,180,872 | 11/1939 | Ford | 269/7 X |
| 2,540,774 | 2/1951 | Beardsley | 51/277 |
| 2,612,082 | 9/1952 | Angell et al. | 29/559 |
| 2,905,064 | 9/1959 | Nielsen | 269/7 |
| 2,937,437 | 5/1960 | Cole et al. | 269/7 X |
| 3,049,766 | 8/1962 | Buckminster | 51/277 |
| 3,083,002 | 3/1963 | Lacey | 269/7 |
| 3,118,198 | 1/1964 | Prunier | 51/277 X |
| 3,128,090 | 4/1964 | Andersen | 269/7 |
| 3,526,397 | 9/1970 | Verguson | 269/7 |
| 3,589,704 | 6/1971 | Kurtz | 269/7 |

*Primary Examiner*—James L. Jones, Jr.
*Assistant Examiner*—Mark S. Bicks
*Attorney, Agent, or Firm*—Jerome A. Gross

[57] ABSTRACT

Chucking apparatus of the meltable matrix type. A first heat-conductive metal chuck body, fenced with rubber, has a workpiece locator support which establishes an axis below which molten matrix metal is filled, and relative to which two opposite surfaces of a workpiece may be successively machined, as by programmed machine tools. The workpiece is not released from the first chuck until its exposed surface, having been machined, is embedded in the matrix material of a second chuck. To do this, the first chuck is inverted over the second chuck and maintained cool while molten matrix metal is filled into the second chuck. To permit use of matrix metal which would not adhere directly to metal workpieces, surfaces of the workpiece to be embedded are first coated with a heat curable adhesive, which is cured by the heat of the cooling matrix metal.

10 Claims, 5 Drawing Figures

PATENTED FEB 5 1974 3,790,152

INVENTOR
JOHN T. PARSONS

By Jerome A. Gross
ATTORNEY

INVENTOR
JOHN T. PARSONS

MELTABLE MATRIX CHUCKING APPARATUS

BACKGROUND OF THE INVENTION

Meltable matrix materials, both low melting point metals and non-metallic materials have been used to partially embed and securely hold workpieces, leaving exposed a surface to be machined or ground. However shortcomings in apparatus and processes have limited the use of such meltable matrix chucking. For example, workpieces having thin sections, such as propeller blade castings, are likely to warp if after machining one only of the two major surfaces, the workpiece is released from the matrix. Metal matrixes, whose heat conductivity speeds melting and solidifying, will not adhere to metal workpieces, and even plastic matrixes do not adhere satisfactorily to smoothly machined surfaces. No prior apparatus known to the inventor permits the transfer of a workpiece, machined on one surface, to a second matrix chuck for embedding the machined surface prior to release from the first chuck; yet such transfer, in precise alignment with the first chuck, is necessary if machining operations for the entire workpiece are to be pre-programmed.

SUMMARY OF THE INVENTION

The purposes of the present invention include providing meltable matrix chucking adapted to pre-programmed machining operations, including programs for transfer of a workpiece from a first chuck to the second chuck prior to its release from the first chuck, and for support of a workpiece along a known locating axis. Another purpose is to provide chuck fencing means to seal against the irregular contour of a workpiece, and external filling and drain provisions, so that molten matrix material may embed substantially a workpiece undersurface of a workpiece whose outer edge is not in a horizontal plane, for example, a turbine blade. A still further purpose is to provide a process whereby metal matrix material may be used to securely embed even the smoothly machined surfaces of metal workpieces, thus to take advantage of the heat conductivity of metal matrix material in obtaining a rapid melting and solidifying.

These, and other objects which will be apparent from this specification, are achieved in the present invention by chucking apparatus now generally described. Where the workpiece to be machined has two opposite major surfaces, two similar chucks are utilized, each having a rigid heat conductive metal body whose upper matrix-supporting surface grasps the matrix material in a retention groove. An elastic fence surrounds the chuck upper surface, extending around it high enough to provide a hollow to contain the matrix material; its height may vary to seal against a non-horizontal workpiece edge. A passage extending downward from the chuck surface and outward to the exterior of the body connects to external filling and drain means. Locating means, remote from the undersurface and preferably at the base of the chuck body, locate it on a machine tool and also in the fixture hereafter described.

Provisions are made to heat and cool the metal chuck bodies. In the preferred embodiment, a coolant liquid is pumped through a flow passage in the chuck body. While this passage might be used for heating, I prefer to use a plate-like electric heater on the fixture hereafter described. The external filling means also has a heater to melt out residual matrix material. At least one of the chucks includes workpiece support means to establish a reference axis, above the matrix level, whose position relative to the chuck locating means is known.

The fixture of the present invention serves to superimpose either chuck over the other, in positions located by their locating means and known in relation to the workpiece support reference axis. In the embodiment described, the fixture includes a pair of plates depending from support arms which are hinged to each other and having an open position in which the chucks are supported, on heaters on the support plates, in a common horizontal plane. Either support plate, with the chuck attached to it, may be moved to a closed position superimposed over the other, preliminary to transferring the workpiece from the upper to the lower chuck. Transfer is effected from the first chuck, after machining the workpiece surface left exposed, by inverting it to a position known in reference to the workpiece support reference axis, with the machined surface downward over the second chuck, filling the second chuck with matrix material to embed the machined surface, and permitting the matrix material in the second chuck to solidify. Pumped coolant hastens solidifying the second matrix; and cooling the first chuck assures that its matrix will not be melted away. The chucks are then inverted so that the first chuck is under the second, and thereafter the matrix material in the first chuck is melted away, preferably cooling the second chuck to maintain its matrix solidly embedding the machine surface of the workpiece. The second chuck is then transferred from the fixture to a machine tool, to machine the exposed surface of the workpiece. This makes possible a complete machining operation programmed relative to the workpiece support reference axis.

In a novel method of using the present chucking apparatus, metal matrix material is employed to securely hold a metal workpiece, even by one of its surfaces which has been smoothly machined. This is accomplished by coating the workpiece surface with a heat curable adhesive, embedding it in the molten matrix metal, cooling the metal only enough to solidify it, and then stopping the cooling, to use its residual heat to cure the adhesive. This bonds the workpiece to the metal matrix more securely then would be possible if plastic matrix material were used; and the strength and heat-transfer characteristics of metal matrix material are utilized advantageously.

DESCRIPTION OF THE PREFERRED EMBODIMENT

Figure 1:
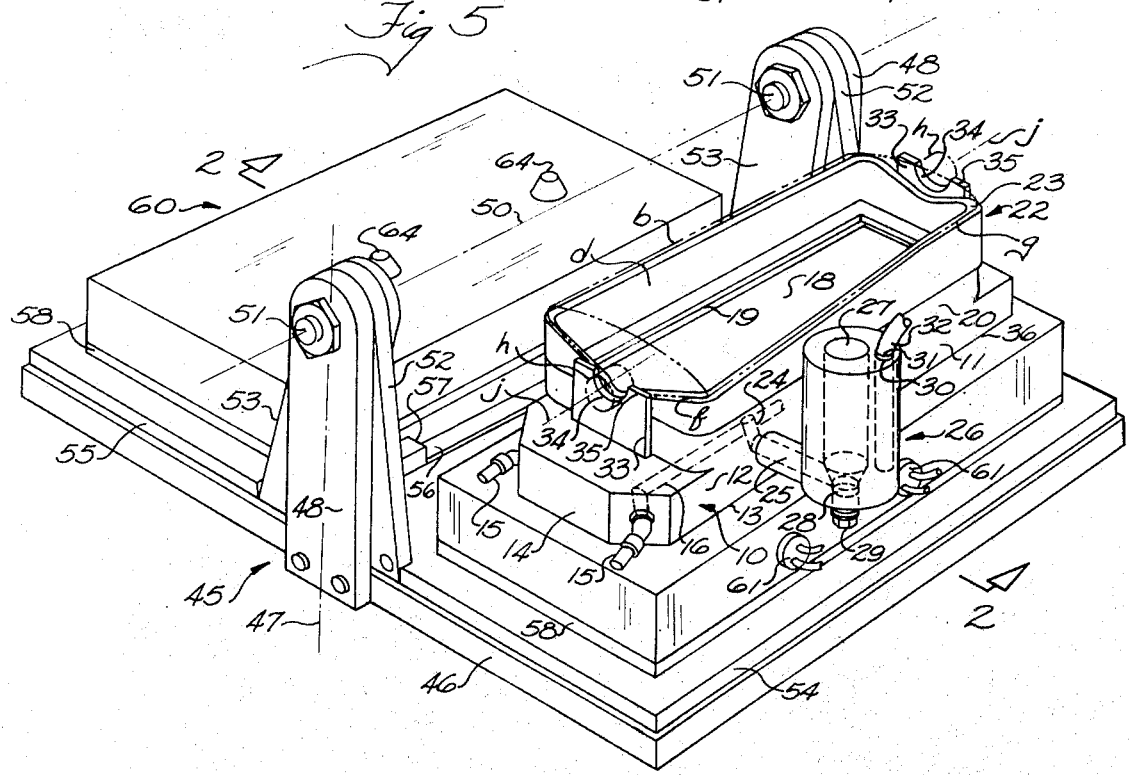
FIG. 1 is a perspective sketch showing a meltable matrix chuck in place at the right side of a superimposing fixture, shown in open position. The phantom lines show a workpiece to be located thereon.

A preferred embodiment of the present invention, illustrated in the drawings, is designed to embed turbine blade blanks and thus chuck them for machining. The workpiece $b$ is a forged blade blank having the warped configuration shown in FIG. 1, and is illustrated as being nearly rectangular in plan form, with a major surface $d$ first to be machined uppermost and its opposite major surface $e$, to be first embedded, lowermost. Its edge $g$ is of warped contour which rises and falls as shown in FIG. 1. The workpiece $b$ is provided with preferably integral elongated shaft-like end projections $h$ extending from its opposite ends along a reference axis $j$; alternately, pins may be inserted into aligned bores on such axis.

A first meltable matrix chuck generally designated 10 is shown in FIG. 1. It includes a rigid chuck body 11, formed of a heat conductive metal such as aluminum. The body 11 includes a substantially elongated rectangular base portion 12. At one vertical edge 14 of the base portion 12, quick connect provisions 15 communicate to a coolant liquid passage 16 shown in dashed lines.

Rising integrally from the base portion 12 is an upper chuck portion, formed in this embodiment to fit the workpiece $b$ to be machined. It has an upper matrix supporting surface 18 in which is formed a dovetail groove 19, useful to grasp and hold a solidified matrix inward of its outer vertical surface 20. Fencing means are provided to surround the upper surface 18 and to extend to a level above it, thus providing a hollow chuck top within which meltable matrix material is contained. In the present instance the fencing means utilized is a molded silicone rubber fence generally designated 22. Its lower portion elastically grasps about the chuck outer surface 20. Its width corresponds substantially to the workpiece $b$, being slightly larger so that the workpiece will seal against and within its uppermost edge portion 23. The elevation of the uppermost edge portion 23 rises and lowers correspondingly to the elevation of the workpiece $b$ when its axis $j$ is horizontal and its second major surface $e$ is directed downwardly.

Extending downward and outward from the bottom of the dovetail groove 19 to the side surface 20 of the chuck body 11 is a diagonal passage 24 used for filling and draining the chuck 10 with meltable matrix material. Where the passage 24 reaches the side surface 20, it connects through a short horizontal tube 25 to a combined filling and draining spout generally designated 26. The spout 26 extends to a height at least as great as the uppermost edge 23 of the fencing means 22. The spout 26 may be oval in plan form, as shown. At its larger-diameter side, to which the tube 25 connects, it has a vertical filling well 27 which converges below the level of the tube 25 to a smaller diameter drain portion 28, normally closed by a screw plug 29. Outwardly adjacent to the well 27 is a vertical bore 30 in which an electrical resistance heater 31 is positioned, to be energized by a source of current not shown. Like the chuck body 11, the spout 26 is made of a conventional heat conductive structural metal such as aluminum.

Closely adjacent to the fencing means 22 at opposite ends of the chuck 10 are means to establish and locate the workpiece $b$ with its axis $j$ in a precisely known position, spacedly above the chuck upper matrix supporting surface 18. For the workpiece $b$ illustrated, these means include a pair of vertical workpiece support blocks 33 secured outwardly of the fencing means 22. Each block 33 has a semi-cylindrical groove 34 aligned on a longitudinal axis which will coincide with the workpiece axis $j$, the groove 34 being of the same radius as the workpiece end projections $h$. Portions of the top edge surface of the block 33 which flank the semi-cylindrical groove 34, referred to as planar part locator projections 35, are horizontal and in a plane with each other.

Figure 2:
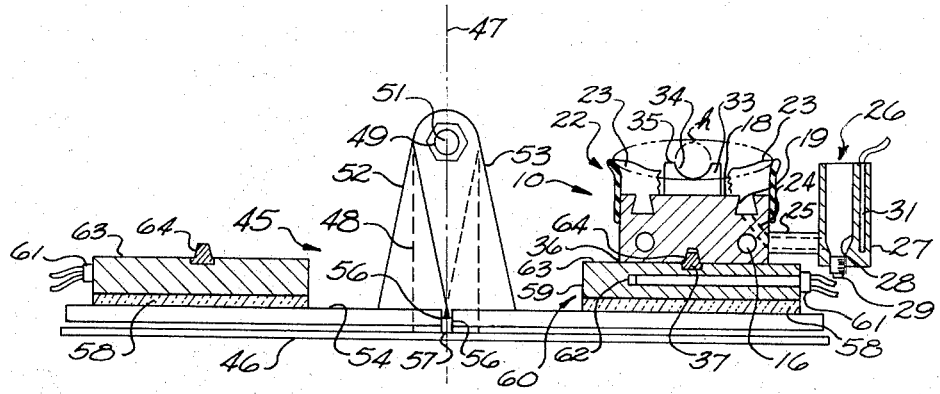
FIG. 2 shows the fixture and chuck in section taken along line 2—2 of FIG. 1.

In order that the machining of the workpiece $b$ may proceed with reference to the axis $j$, so established by the semi-cylindrical grooves 34, it is necessary that the chuck 10 have means sufficiently remote from the upper surface 18 of the chuck body not to interfere with it, to locate the chuck body 11 on a tool for machining. These locating means include a chuck body lower plane surface 36 and two or more locating bores 37 therein, one of which is shown in cross-section in FIG. 2. The bores 37 taper upwardly; and their positions as well as that of the surface 36 are precisely predetermined relative to the axis $j$. Thus the plane surface 36 and its locating bores 37 serve to locate the chuck 10, both on a machine tool such as a milling machine and in the chuck-superimposing fixture hereinafter described.

Figure 5:
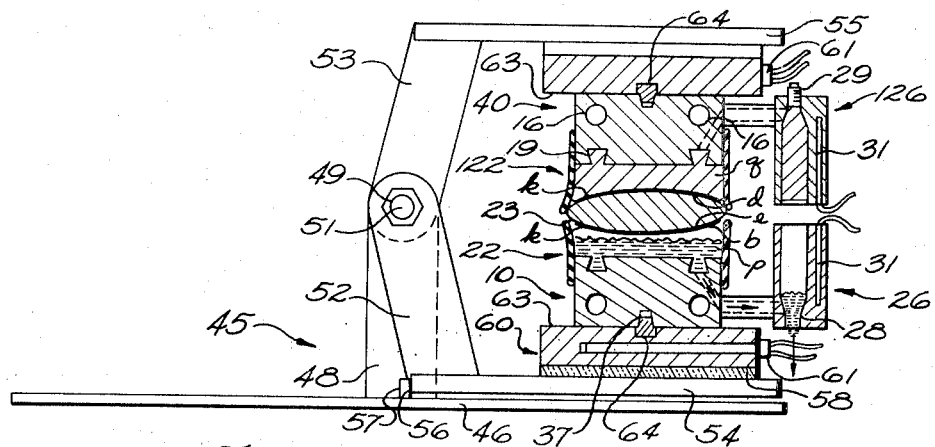
FIG. 5 is a view of the fixture with the chucks of FIG. 4 reversed. The arrows show molten matrix material flowing out of the first chuck, while coolant is pumped through the second.
Figure 4:
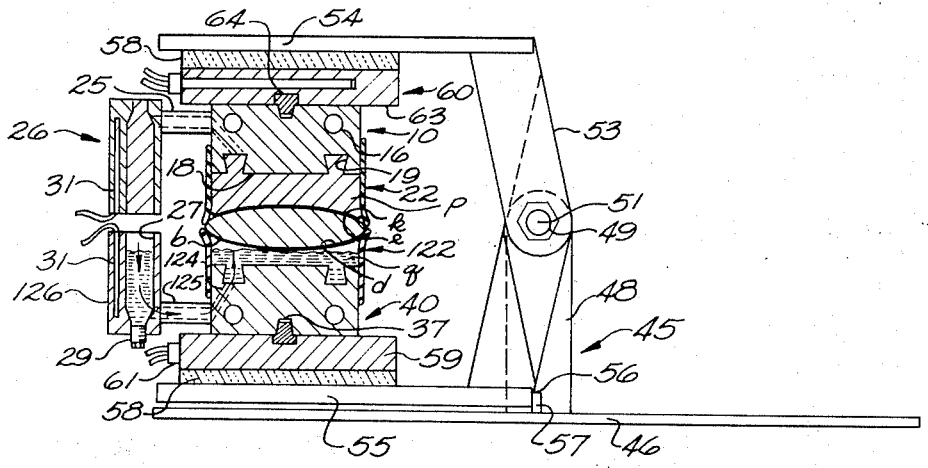
FIG. 4 shows the fixture with the chuck returned thereto after machining the surface of the workpiece first exposed, the chuck being now inverted superimposed over a second chuck at the left side of the fixture. The arrows show molten matrix material being introduced into the second chuck while coolant is pumped through the first chuck.

A second chuck generally designated 40, shown in FIGS. 4 and 5, has structural elements corresponding to those of the first chuck 10 except the workpiece support blocks 33 may be omitted. Where such elements correspond precisely to the elements of the chuck 40, they are referred to by the same reference numerals. However the rubber fence 122 of the second chuck 40 differs in that its configuration is complementary to the fence 22 of the first chuck 10; and the diagonal passage 124, connecting tube 125, and filling spout 126 of the second chuck 40 are positioned conveniently offset, to permit easy use when the chucks 10, 40 are superimposed as shown in FIGS. 4 and 5.

The preferred fixture, generally designated 45, by which the chucks 10, 40 may be inverted and superimposed over each other, is shown in FIGS. 1, 4 and 5. The fixture 45 has a large horizontal base plate 46 symmetrical about a center line 47, erected along which are two standards 48 whose upper ends have aligned bores 49 which establish a hinge axis 50. Hinge pins 51 through the bores 49 support arms 52, 53 each rigidly secured to a chuck support plate 54, 55. These plates have inner edges 56 which abut stop blocks 57 located along the base plate center line 47 when the support plates 54, 55 are in open position in the same horizontal plane as shown in FIG. 1.

The hinge axis 50 is at a height above such common plane equal to the height thereabove of the workpiece support axis $j$ when the chucks 10, 40 are supported thereon, clamped thereto by means not shown. Means are provided on the support plates 54, 55 to cooperate with the locating undersurfaces 36 and locating bores 37 of the chucks 10, 40 so as to locate them symmetrically relative to the hinge axis 50. Thus when the support plates 54, 55 are moved about the hinge axis to a closed position, as in FIG. 4 and FIG. 5, in which their planes of support are parallel to and spaced from each other, one of the chucks 10, 40 will be superimposed inverted over the other, and the reference axis *j* of the workpiece will be in a position precisely known relative to both chucks. Therefore, once a workpiece has been located on the first chuck 10, it may be transferred to the second chuck 40 in precisely the same known position relative to that chuck's undersurface 36 and locating bores 37.

In the embodiments described, the chucks 10, 40 are supported not on the fixture support plates 54, 55 themselves, but rather on supplementary apparatus thereon, namely a thin insulating block 58 whose upper and lower surfaces are parallel and the parallel-surfaced heat conductive metal body 59 of the chuck heater generally designated 60. One or more electrical resistance heaters 61 are fitted in horizontal bores 62 at substantially the mid height of the heater body 59. The upper surface 63 of each heater body 59 positions the planar undersurface 36 of one of the chucks 10, 40. Rising from each heater upper surface 63 at locations precisely predetermined relative to the hinge axis 50 are tapering projecting dowels 64 which serve as locator pins to mate with the bores 37 in the chucks 10, 40.

A factor limiting the usefulness of previous meltable matrix chucks has been their limited ability to grasp metal surfaces, in which respect plastic matrixes have been somewhat superior to metal matrixes as heretofore used. Except for difficulty in achieving a grasp of the workpiece, low melting point metals are preferred over meltable plastic matrix materials because their greater heat conductivity speeds melting and solidifying. The term "low melting point matrix material", as used in this application, includes both metallic and non-metallic matrix material. Such materials, as a known conventional class, are rigidly solid at ordinary workroom temperature and melt at or below the boiling point of commonly available liquids, and in any event well below the temperature at which workpieces formed of the usual structural metals would anneal. A preferred matrix metal is the eutectic alloy known as Ostalloy 158, containing approximately 50 percent bismuth, 26.7 percent lead, 13.3 percent tin and 10 percent cadmium; it will melt at 158°F. and like other alloys containing 40 percent bismuth or more, has the virtue of not shrinking when it solidifies. Typical of low melting point plastic materials is the material known commercially as Rigidax, a compound which melts readily at temperatures below 200°F. Such plastic materials will adhere even to a machined surface of a metal workpiece.

If with the present apparatus metal matrix material is to be used, adherence is achieved through a heat-cured adhesive coating *k* on the workpiece *b*, such as the heat curable epoxy adhesive known as 3M 2216 which cures at about 140° – 150°F. within 35 to 45 minutes. While such an adhesive cannot withstand high temperature, because it may bubble at temperatures above about 250°F., the low melting point metal matrix materials available for use liquefy much below such temperature. Hence molten matrix metal will not impair a coating of such an adhesive.

The temperature of solidification of such a low melting point metal is not critical; for example, coolant may be pumped continuously through the chucks 10, 40 if necessary. I prefer metals which solidify rigidly at a temperature slightly above room temperature, for example, at about 100°F., so the workroom air will in time solidify the matrix. Normally, however, means to cool are used both to solidify the molten matrix material after being filled into the chucks 10, 40 and also to maintain the matrix in one chuck unmelted while the matrix material in the other chuck is molten.

Referring now to the drawings, to use a low temperature matrix metal, an adhesive coating *k* is first applied to substantially the entire undersurface *e* of the workpiece *b* excluding a portion along its edge *g* and its end projections *h*. The workpiece *b* is then positioned with its end projections *h* resting in the semi-cylindrical grooves 34 of the support blocks 33 with its axis *j* corresponding to the axis of the cylindrical grooves 34. The outermost portions of the end projections *h* beyond the rubber fence 22 are clamped, by conventional clamping means not shown, to hold the workpiece *b* downward with its edge *g* sealed against the elastic uppermost edge 23 of the fence 22. The chuck 10 is placed in the fixture 45 in the FIG. 1 position.

Figure 3:
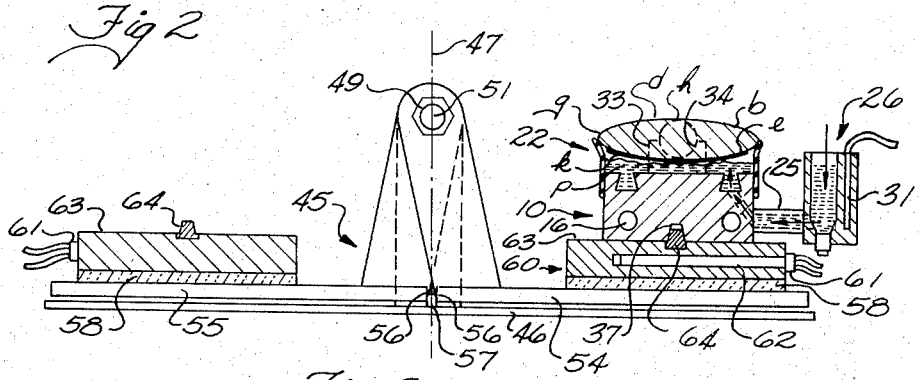
FIG. 3 is a cross-sectional view corresponding to FIG. 2, showing the chuck heated and molten matrix material filled into it to embed the undersurface of the workpiece.

Molten matrix metal, for example Ostalloy 158 whose melting point is 158°F,, is then poured into the filling well 27 of the spout 26 with its drain plug 29 in place. While pouring, both the spout heater 31 and the base heater 60 beneath the chuck 10 may be energized, to avoid premature cooling; they are de-energized as soon as pouring is completed. The molten matrix material is poured slowly, to fill the hollow within the fence 22 up to the workpiece undersurface *e* at all points, regardless of variation in elevation of the workpiece edge *g*. As shown by the arrows in FIG. 3, the matrix material enters from the filling well 27 through the tube 25 upwardly through the diagonal passage 24 to the dovetail groove 19 and rises above the chuck body upper surface 18 against the coating *k* on the workpiece undersurface *e*. The molten metal is so heavy that it would tend to float the workpiece *b* out of position were it not preliminarily clamped in place.

To hasten solidifying into a matrix bed *p*, the quick connect fittings 15 at the end of the coolant passage 16 are connected to a source of refrigerated coolant liquid, which is pumped through the heat conductive chuck body 11. The molten metal matrix, being more heat conductive than plastic matrixes, quickly solidifies at about 158°F. Pumping of the coolant is then discontinued; and the heat which persists in the metal matrix cures the adhesive in say 35 to 45 minutes. The adhesive coating *k* then rigidly interconnects the workpiece undersurface *e* to the solidified matrix bed *p*, held in the chuck groove 19. If desired to then cool the chuck 10 quickly to a handling temperature close to room temperature, pumping of the coolant may be resumed for a brief period.

The clamps are then removed, the coolant conduits are disconnected at the fittings 15, and the chuck 10 is removed to a tool for machining the exposed surface *d* to the desired contour. The chuck 10 is located in the machine tool by its undersurface 36 and locating bores 37; with reference to these the workpiece axis *j* is known, and the support blocks 33 fix the position of the workpiece *b* along the axis *j*. Because of this precise locating, no further attention by a machinist is required; the exposed surface *d* may be automatically machined to contours defined by a tape program.

The chuck 10 is then returned to and located upon the fixture 45 in open position as shown in FIG. 1, and clamped in this position. The surface d, having been machined, is now coated with an adhesive coating k except on its outermost edge g; then the fixture 45 is closed to invert and superimpose the chuck 10 over the second chuck 40 as shown in FIG. 4 at a predetermined height and alignment. The preferred height and alignment are such that the two chucks 10, 40 will be positioned symmetrically relative to the reference axis j, and the edge g of the workpiece b will bear against the uppermost edge 23 of the fence 122 of the second chuck 40. Such height and alignment may be fixed in various ways, either by the fixture 45 or for example without a fixture, merely by equipping the second chuck with support blocks 33 identical to those of the first chuck 10 so that their top surface projections 35 may come into contact.

Preferably, the coolant conduits are then again connected to the first chuck 10, and the base heater 60 of the second chuck 40 and its pouring spout heater 31 are energized. Molten matrix material is filled into the second chuck 40 to embed the surface d in a second matrix bed q. Although heat of the molten metal will in part pass through the new coating k and workpiece b, melting of the matrix bed p of the first chuck 10 is prevented by the coolant pumped through its passage 16.

When the second matrix bed q is in place, embedding the machined surface d in the second chuck 40, its base heater 60 is de-energized. The matrix bed q is then reduced to solidification temperature by connecting the coolant conduits 15 and pumping coolant through to its chuck 40; after solidification, pumping is discontinued while heat in the solidified matrix bed q cures the adhesive. There will then be such a firm adhesive bond at both workpiece surface e and d as to connect the chucks 10, 40 rigidly together; this allows the first chuck 10 to be released without losing the relation of the second chuck 40 to the reference axis j.

To do this, the chucks 10, 40, clamped to their respective support plates 54, 55, are swung together about the hinge axis 50 to the other side of the fixture 45, to invert and superimpose the second chuck 40 over the first chuck 10 as shown in FIG. 5. The drain plug 29 of the first chuck spout 26 is removed; its spout heater 31 and chuck base heater 60 are energized; and the matrix bed p in the chuck 10 is melted and flows out through the drain 28 portion. Meanwhile coolant liquid is pumped through the second chuck 40 to prevent melting of its matrix bed q.

The second chuck 40, now holding the workpiece b is removed from the fixture 45 to a milling machine where it is located by its locating surface and bores 36, 37. The workpiece surface e is then machined to final contour, its coating k being first removed. This machining operation, programmed relative to the known position of the workpiece b, may be controlled by a mere continuation of the same tape program as was used for machining the first surface d.

With the fixture 45 in open position as in FIG. 1, the chuck 40 is returned to its support plate 55, its spout drain plug 29 is removed, and the spout heater 31 and base heater 60 are energized to melt away the matrix bed q, releasing the workpiece surface e, whose adhesive coating k is then removed. The end projections h, if integral and not machined off during the machining operations, are cut off as a final operation.

Various alternatives in apparatus and method may be employed. Other types of workpieces may require less accuracy in preliminary positioning along a reference axis; for example, in some uses the workpiece may rest on a single reference point, while in others more than two reference points may be desirable. The rubber fence 22 is especially useful where the matrix material is to be flowed against a workpiece surface whose level varies. For simpler parts, removable rubber fences may be substituted, or fixed position metal fences spaced from the edge of the workpiece.

The apparatus of the present invention is also advantageous for use with the plastic matrix material referred to, without any adhesive coating k, where the shape of the machined workpiece surface is so grooved or irregular that the plastic will grasp it with sufficient security. Although plastic matrix material heats and cools slowly, this disadvantage is partly compensated for by the advantage that its cooling need not be interrupted to cure any adhesive.

Instead of the hinged fixture 45, other provisions may be substituted to hold one chuck inverted and superimposed over the other. For example, if both chucks 10, 40 have support blocks 33, their aligned abutment with each other would of itself provide for their inverted superposition. The base heater 60 may be eliminated by merely pumping a hot liquid (for example, water at 200°F.) through the chuck coolant passage 16. If the workpiece is relatively thick or for other reasons is not quick to conduct heat, the coolant provisions might be dispensed with provided the heat of the matrix material is carefully limited. These changes in apparatus and method carry with them obvious limitations, compared with the preferred embodiment described.

While the detailed description of the present embodiment refers to chucks inverted and superimposed over each other, this would not apply to every application. For example, in machining rectangular workpieces, chucks might be presented adjacent to each other at angles corresponding substantially to those of the workpiece, maintaining in horizontal position only the chuck in which the matrix was molten; and its horizontal positioning, though preferred, would not be required if the fencing sealed completely against the entire workpiece edge.

I claim:

1. A chuck for machining a workpiece of the type having an axis between two sides to be machined, according to the process of machining in which one such workpiece side is embedded in a matrix of a low-melting point material flowed beneath it and contained in such chuck, then the other side is machined and then embedded in such material of a second such chuck, and the first such chuck is released to permit machining of the side first so embedded, and the side last embedded is then released; which chuck comprises a rigid chuck body having a generally horizontally disposed upper matrix-supporting surface, fencing means, surrounding said upper surface and extending to a level thereabove, whereby to provide a hollow chuck top within which to contain such matrix material when in molten condition, passage means through said chuck body communicating from said upper surface within said fencing means to the exterior of the body, filling means extending from a level spaced above said upper surface and communicating with said passage means, means to drain molten matrix material from said upper surface, locating means, remote from said upper surface, to locate the chuck body on a machine tool, and support means to establish a support axis for such workpiece at a predetermined spacing spacedly above said upper surface, whereby to permit flow of molten matrix material beneath such workpiece supported on such support axis and whereby the transfer of such workpiece, so supported on said axis, to support means of a second similar chuck permits preprogrammed successive machining of both sides of such workpiece.

2. A chuck as defined in claim 1, wherein the chuck body is formed of heat-conductive metal, together with means to heat and to cool the chuck body.

3. A chuck as defined in claim 2, together with means to heat the filling means and the means to drain.

4. The chuck as defined in claim 1, wherein the upper matrix supporting surface of the chuck body includes a matrix retaining groove, and wherein said passage means which extends to the exterior of the body connects from the bottom of said groove sidewardly downward and outward to both the filling means and the means to drain.

5. Chucking apparatus for precise positioning of a workpiece having an axis in two related positions for machining surfaces thereof on opposite sides of such axis, comprising two chucks, each including a rigid body formed of heat-conductive metal and having an upper matrix-supporting surface, means to establish a workpiece support axis at a predetermined spacing above said upper surface and to support a workpiece positioned along such axis, fencing means, surrounding said upper surface and extending to a level thereabove, whereby to provide a hollow chuck top, passage means communicating from said upper surface within said fencing means to the exterior of the body, means communcating with said passage means, to fill molten matrix material into said upper surface under such workpiece, means to heat and means to cool the chuck body of each chuck separately from that of the other chuck, means to drain molten matrix material from said upper surface, and locating means, remote from said upper surface, to locate the chuck body on a machine tool, in combination with fixture means to position either chuck closely adjacent to the other in positions located in part by the said locating means of the chucks and known in relation to such workpiece support axis, said fixture means comprising a pair of support plates, each having means to define a plane of support for one of said chucks, and arms projecting from said support plates to pin means at a hinge axis, whereby the support plates may be moved to a closed position in which such planes of support are parallel to and spaced from each other.

6. Chucking apparatus as defined in claim 5, wherein said means to heat comprises, for each chuck, a parallel-surfaced heater body fixed in position on one of said support plates, and wherein the upper surfaces of said heater bodies serve as said means to define planes of support.

7. Chucking apparatus as defined in claim 5, wherein the fixture means further has an open position in which the planes of chuck support are in a common horizontal plane, and has means cooperating with the locating means of the chuck bodies to locate them on said support plates symmetrically relative to said hinge axis, the hinge axis being at a height above such common plane equal to the height thereabove of such workpiece support axis.

8. Chucking apparatus of the meltable matrix type for partially embedding and thus holding workpieces in a plurality of different positions for machining, comprising two similar chucks, each having a rigid heat conductive metal body having an upper surface, means to heat and to cool the heat-conductive chuck bodies, whereby such matrix may be melted and solidified, fencing means, surrounding said upper surface and extending to a level thereabove, to contain such matrix when molten, and means remote from said upper surface to locate the body in a predetermined alignment, at least one of said chucks having means to establish a workpiece support axis spacedly above its upper surface, together with fixture means to superimpose either of said chucks inverted over the other.

9. Chucking apparatus as defined in claim 8, wherein the fencing means has an uppermost portion formed of a heat resistant, elastic rubber-like material.

10. Chucking apparatus as defined in claim 9, wherein the fencing means to contain the molten matrix has a plan form corresponding to that of such workpiece and the elevation of its said uppermost portion rises and lowers correspondingly to such workpiece, whereby to so seal against such workpiece as to permit filling molten matrix material against substantially the entire undersurface of such workpiece.

* * * * *